(No Model.)
H. Y. CASTNER.
MANUFACTURE OF OXIDES OF THE ALKALINE METALS.
No. 494,757. Patented Apr. 4, 1893.
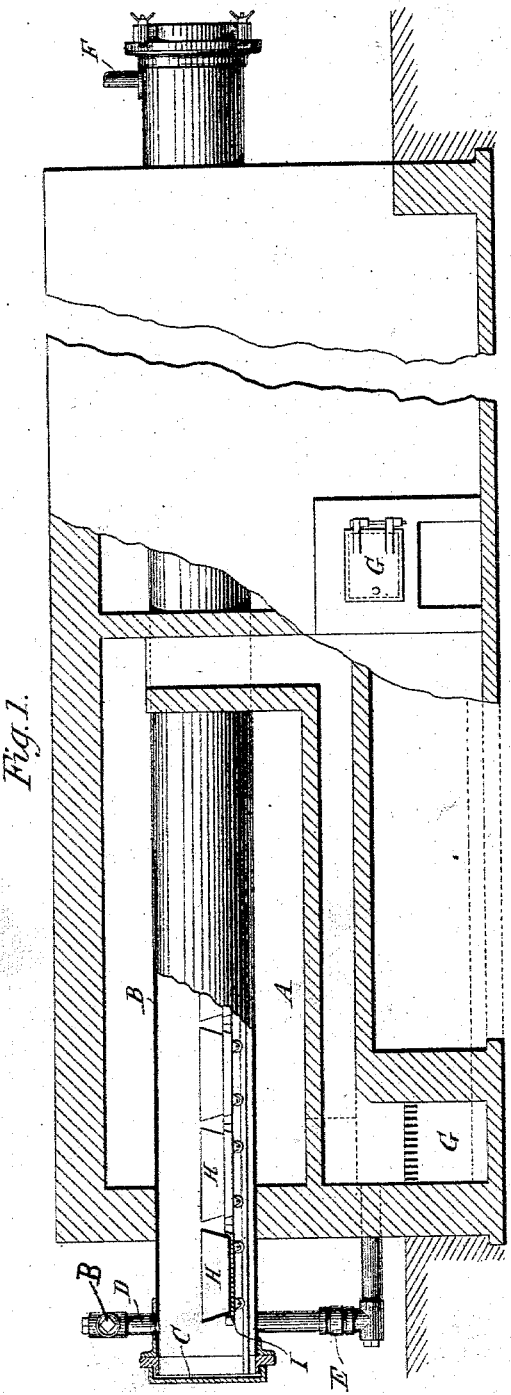
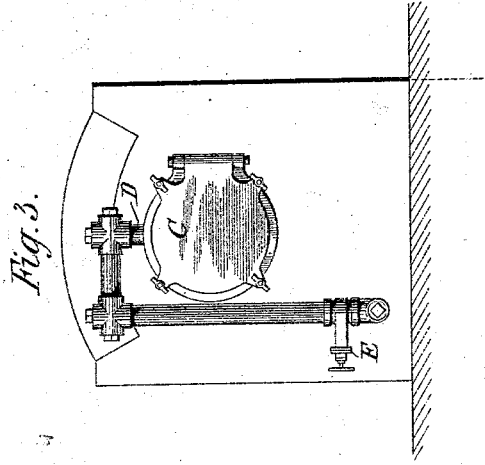
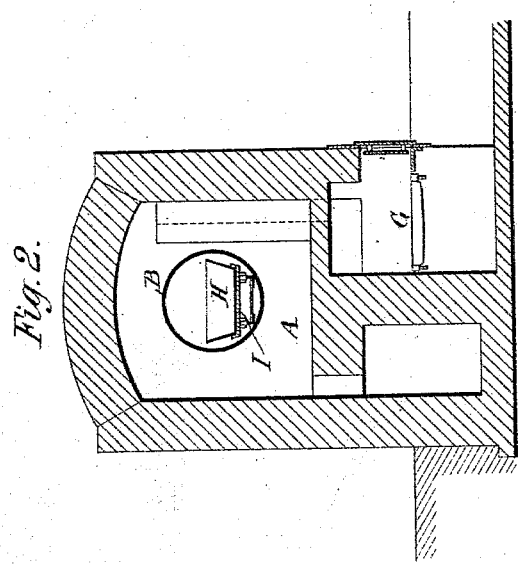
Witnesses:
H. S. McArthur
E. L. Thrasher
Inventor:
Hamilton Y. Castner
By Foster Freeman
Attorneys.

UNITED STATES PATENT OFFICE.

HAMILTON YOUNG CASTNER, OF LONDON, ENGLAND.

MANUFACTURE OF OXIDES OF THE ALKALINE METALS.

SPECIFICATION forming part of Letters Patent No. 494,757, dated April 4, 1893.

Application filed November 18, 1891. Serial No. 412,306. (No model.)

*To all whom it may concern:*

Be it known that I, HAMILTON YOUNG CASTNER, a citizen of the United States, residing at Cannon Street, in the city of London, England, have invented a certain new and useful Improvement in the Manufacture of the Higher Oxides of the Alkaline Metals; and I do hereby declare that the following is a full, clear, and exact description of the invention, which will enable others skilled in the art to which it appertains to make and use the same.

The peroxides of sodium and potassium have been produced in the laboratory in minute quantities by oxidizing the alkaline metals by the slow action of the atmosphere with a final treatment by oxygen gas. So far as I am aware these experiments have always been carried on in glass vessels or flasks in which the oxidation has been carried on very slowly so as to prevent the generation of intense heat, as otherwise, the alkaline oxide, or metal would combine with and destroy the glass. After a series of experiments I have discovered a means whereby the peroxides or the higher oxides of the alkaline metals may be manufactured in a rapid and continuous manner, so as to produce the material in a commercial manner, producing at the same time a uniform quality of product.

Briefly stated the method of manufacture consists of treating the alkaline metals while contained in aluminium vessels at a temperature of 300° centigrade to the gradual oxidizing action of a gradually increasing mixture of oxygen and nitrogen; the pure metal commencing to be oxidized by air almost deprived of oxygen, while the oxide almost completely oxidized is treated with air containing the full amount of oxygen; such process may be carried out by means of the apparatus hereinafter described reference being made to the accompanying drawings, in which—

Figure 1 is an elevation partly in section, of the apparatus I now propose to employ. Fig. 2 is a sectional elevation and Fig. 3 an end view.

Within the furnace A, is placed an iron or other pipe B, provided with tightly fitting end plates C. Opening into pipe B, is the air supply pipe D, provided with a suitable valve E, the pipe B being also supplied with a suitable escape pipe F. The furnace may be heated by one or more fireplaces G, or by gas or liquid fuel. The alkaline metal to be oxidized is placed in aluminium vessels or receptacles H which may be carried on a species of tramway carriages I. I deem that it will be preferable to first heat the furnace to a temperature of about 300° centigrade after which the receptacles H having been previously charged with a small quantity of the alkaline metal are introduced into the pipe B and moved along so as to occupy the full length thereof. Air previously freed from all moisture and carbon dioxide is then forced or drawn through the pipe B until a sufficient amount is passed through the apparatus to effect a preliminary oxidation after which the amount of air admitted is regulated by valve E, so as to allow a steady and continuous flow of a definite quantity for any given time. It will be found that the metal will be most rapidly oxidized at the end of the tube at which the air enters, and it will be possible therefore to first remove the dishes at that end of the tube replacing them by fresh material in fresh vessels from the other end of the tube gradually feeding the tram-way carriages forward to allow of this introduction. It follows from this method of procedure that the oxide just before being removed is being subjected to the action of practically pure air, while the metal at the other extremity of the tube B is being slowly oxidized by air almost deprived of oxygen, and the intermediate dishes are being proportionately more or less rapidly oxidized, depending upon their positions.

From the foregoing description it will be evident that the tube B may be made of aluminium and the alkaline metal placed directly therein; but I do not consider this such an advantageous method of manufacture.

Among the industrial uses to which the alkaline peroxides may be put, it may be said that the peroxide of sodium can be used in place of the peroxide of barium in the manufacture of hydrogen peroxide which is so largely used for bleaching purposes. The peroxides may be used for other purposes in the art, which need not be herein recited. The advantage of using aluminium vessels over other metallic vessels is that the aluminium may be employed without injuriously affecting the peroxide to be produced; other metal vessels so far as known to me introduce impurities into the higher oxides, which render them practically useless for making hydrogen peroxide.

What I claim is—

1. In the manufacture of the higher oxides of sodium or potassium from the alkaline metals, the process substantially as hereinbefore set forth which consists in heating the material to about 300° centigrade, and while maintaining this temperature oxidizing the metal by the action of air with a decreasing proportionate mixture of nitrogen.

2. In apparatus for the manufacture of the higher oxides of the alkaline metals, the combination of vessel H, pipe B, provided with the end doors C, furnace A, air supply pipe D at the discharge end of pipe B, and air discharge pipe F at the feed end of the pipe B, substantially as described.

3. In apparatus for the manufacture of the higher oxides of the alkaline metals, the combination of a heated chamber, means for passing the oxidizing gases through said chamber, and vessels containing the oxide to be treated, the vessels being arranged to pass through the chamber in a direction opposite to the current of oxidizing gases whereby the material may be continuously treated, substantially as described.

In testimony whereof I have hereunto set my hand in the presence of two subscribing witnesses.

HAMILTON YOUNG CASTNER.

Witnesses:
G. H. CLARKSON,
JOHN J. CUMMINGS,
*Both of No. 115 Cannon Street, London.*